United States Patent
Jeong et al.

(10) Patent No.: US 10,098,114 B2
(45) Date of Patent: *Oct. 9, 2018

(54) METHOD FOR ALLEVIATING HIDDEN NODE PROBLEM IN WLAN SYSTEM

(71) Applicant: KT CORPORATION, Gyeonggi-do (KR)

(72) Inventors: Yang Seok Jeong, Seoul (KR); Joo Young Kim, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/616,046

(22) Filed: Jun. 7, 2017

(65) Prior Publication Data

US 2017/0280450 A1 Sep. 28, 2017

Related U.S. Application Data

(63) Continuation of application No. 14/786,176, filed as application No. PCT/KR2014/004100 on May 8, 2014, now Pat. No. 9,706,551.

(30) Foreign Application Priority Data

May 10, 2013 (KR) .................. 10-2013-0053380

(51) Int. Cl.
*H04W 4/00* (2018.01)
*H04W 72/04* (2009.01)
(Continued)

(52) U.S. Cl.
CPC ...... *H04W 72/0446* (2013.01); *H04W 74/006* (2013.01); *H04W 74/04* (2013.01); *H04W 74/0816* (2013.01); *H04W 84/12* (2013.01)

(58) Field of Classification Search
None
See application file for complete search history.

(56) References Cited

U.S. PATENT DOCUMENTS 7,184,407 B1 2/2007 Myles et al.
2004/0165563 A1 8/2004 Hsu et al.
(Continued)

FOREIGN PATENT DOCUMENTS

CN 1310477 C 4/2007
CN 102027795 A 4/2011
(Continued)

*Primary Examiner* — Bob Phunkulh
(74) *Attorney, Agent, or Firm* — IP Legal Services, LLC

(57) ABSTRACT

Disclosed is a method for alleviating a hidden node problem in a wireless local area network (WLAN) system. A method for detecting a hidden node comprises the steps of: configuring a first restricted access interval used for a plurality of terminals transmitting a hidden node detection frame; configuring a second restricted access interval used for a plurality of terminals transmitting a hidden node report frame generated on the basis of an HND frame; generating a beacon including configuration information of the first restricted access interval and configuration information of the second restricted access interval; and transmitting the generated beacon. Accordingly, a terminal in a hidden node relation can be detected.

8 Claims, 16 Drawing Sheets

(51) Int. Cl.
*H04W 74/00* (2009.01)
*H04W 84/12* (2009.01)
*H04W 74/04* (2009.01)
*H04W 74/08* (2009.01)

(56) References Cited

U.S. PATENT DOCUMENTS

| | | |
|---|---|---|
| 2004/0264428 A1 | 12/2004 | Choi et al. |
| 2005/0047386 A1 | 3/2005 | Yi |
| 2005/0213601 A1 | 9/2005 | Ginzburg et al. |
| 2007/0280156 A1 | 12/2007 | Kwon et al. |
| 2009/0285165 A1 | 11/2009 | Berglund et al. |
| 2010/0165963 A1 | 7/2010 | Chu et al. |
| 2011/0176434 A1 | 7/2011 | Pandey et al. |
| 2013/0128798 A1* | 5/2013 | Liu ................. H04W 48/12 370/312 |
| 2013/0195036 A1 | 8/2013 | Quan et al. |
| 2014/0003414 A1 | 1/2014 | Choudhury et al. |
| 2014/0112246 A1 | 4/2014 | Park et al. |
| 2014/0126461 A1* | 5/2014 | Ghosh ............... H04W 88/04 370/315 |
| 2014/0153415 A1 | 6/2014 | Choudhury et al. |

FOREIGN PATENT DOCUMENTS

| | | |
|---|---|---|
| KR | 10-2005-0003575 A | 1/2005 |
| KR | 10-0542348 B1 | 1/2006 |
| KR | 10-2007-0116461 A | 12/2007 |
| KR | 10-2011-0020038 A | 3/2011 |

* cited by examiner

METHOD FOR ALLEVIATING HIDDEN NODE PROBLEM IN WLAN SYSTEM

CROSS REFERENCE TO RELATED APPLICATIONS

The application is a Continuation of U.S. patent application Ser. No. 14/786,176 (filed on Oct. 22, 2015), which is a National Stage Patent Application of PCT International Patent Application No. PCT/KR2014/004100 (filed on May 8, 2014) under 35 U.S.C. § 371, which claims priority to Korean Patent Application No. 10-2013-0053380 (filed on May 10, 2013), the teachings of which are incorporated herein in their entireties by reference.

BACKGROUND

The present invention generally relates to technology for alleviating a hidden node problem and, more particularly, to a method for alleviating a hidden node problem by setting a restricted access window in a wireless local area network (WLAN) system.

With the development of information and communication, various wireless communication technologies have been developed. Among technologies, wireless local area network, (WLAN) denotes technology for allowing wireless access to the Internet in homes, businesses or specific service areas using a mobile terminal such as a personal digital assistant (PDA), a laptop computer, a portable multimedia player (PMP), a smart phone, or a tablet PC, based on radio frequency (RF) technology.

Standards for WLAN technology have been developed as Institute of Electrical and Electronics Engineers (IEEE) 802.11 standards. IEEE 802.11a provides a data rate of 54 Mbps in a 5 GHz unlicensed band. IEEE 802.11b provides a data rate of 11 Mbps using a direct sequence spread spectrum (DSSS) in a 2.4 GHz band. IEEE 802.11g provides a data rate of 54 Mbps using orthogonal frequency division multiplexing (OFDM) in a 2.4 GHz band. IEEE 802.11n provides a data rate of 300 Mbps for four spatial streams using multiple input multiple output-OFDM (MIMO-OFDM). IEEE 802.11n supports a channel bandwidth of up to 40 MHz, and provides a data rate of 600 Mbps in this case.

With the fast popularization of such a WLAN and the diversification of applications using the WLAN, the necessity for new WLAN technology for supporting throughput higher than a data processing speed supported by IEEE 802.11n has increased. Very High Throughput (VHT) WLAN technology is one of IEEE 802.11 WLAN technologies proposed to support a data processing speed of a 1 Gbps or higher. Among the technologies, IEEE 802.11ac is a standard for providing very high throughput in a band of 6 GHz or less, and IEEE 802.11ad is a standard for providing very high throughput in a 60 GHz band.

In addition, standards for various WLAN technologies have been established, and the development of standards has been conducted. Representatively, IEEE 802.11af is a standard defined for the operation of a WLAN in TV white space, IEEE 802.11ah is a standard defined to support a large number of terminals operating in low power, and IEEE 802.11ai is a standard defined for fast initial link setup (FILS) in a WLAN system. Recently, in a congested environment in which multiple base stations and terminals are present, the development of an IEEE 802.11 high efficiency WLAN (HEW) standard aimed at improving frequency efficiency is ongoing.

In systems based on such WLAN technology, multiple terminals in a hidden node relationship may be present. In this case, a signal collision between terminals and retransmission caused by the signal collision frequently occur, thus resulting in a problem in which the efficiency of wireless channels is rapidly deteriorated.

SUMMARY

An object of the present invention to solve the above problems is to provide a method for setting a restricted access window to alleviate a hidden node problem.

Another object of the present invention to solve the above problems is to provide a method for detecting terminals in a hidden node relationship.

A method for setting a restricted access window according to an embodiment of the present invention to accomplish the above object includes setting a first restricted access window that starts from a first time in a beacon interval and that is used for channel access for a first terminal group including at least one terminal, setting a second restricted access window that starts from a second time that is a predefined time after the first time and that is used for channel access for a second terminal group including at least one terminal, generating a beacon that includes setting information of the first restricted access window and setting information of the second restricted access window, and transmitting the generated beacon, wherein the first restricted access window and the second restricted access window overlap each other from the second time.

Here, the predefined time may be greater than a sum of a length of a PS-Poll frame and a length of a distributed interframe space and may be less than a length of a time slot.

Here, the first terminal group may include a terminal other than the terminal included in the second terminal group.

Here, the first terminal group may have priority higher than that of the second terminal group.

Here, the first restricted access window may include at least one time slot, and different terminals may be allocated to respective time slots.

Here, the second restricted access window may include at least one time slot, and different terminals may be allocated to respective time slots.

A method for setting a restricted access window according to another embodiment of the present invention to accomplish the object includes setting a restricted access window that is located in a beacon interval and is used for channel access between terminals, setting a time offset between a first sub-restricted access window and a second sub-restricted access window included in the restricted access window, generating setting information of a restricted access window including the time offset, generating a beacon including the setting information of the restricted access window, and transmitting the generated beacon, wherein the first sub-restricted access window is used for channel access for a first terminal group including at least one terminal, and the second sub-restricted access window is used for channel access for a second terminal group including at least one terminal, and wherein the first sub-restricted access window and the second sub-restricted access window overlap each other from a time indicated by the time offset.

Here, the time offset may be greater than a sum of a length of a PS-Poll frame and a length of distributed interframe space and may be less than a length of a time slot.

Here, the first terminal group may include a terminal other than the terminal included in the second terminal group.

Here, the first terminal group may have priority higher than that of the second terminal group.

Here, the first sub-restricted access window may include at least one time slot, and different terminals may be allocated to respective time slots.

Here, the second sub-restricted access window may include at least one time slot, and different terminals may be allocated to respective time slots.

A hidden node detecting method according to an embodiment of the present invention to accomplish the other object includes setting a first restricted access window that is used for multiple terminals, each transmitting a hidden node detecting (HND) frame, setting a second restricted access window that is used for the multiple terminals, each transmitting a hidden node reporting (HNR) frame generated based on the HND frame, generating a beacon including both setting intonation of the first restricted access window and setting information of the second restricted access window, and transmitting the generated beacon.

Here, the hidden node detecting method may further include receiving HNR frames from the multiple terminals in the second restricted access window, and detecting terminals having a hidden node relationship among the multiple terminals based on the received HNR frames.

Here, the HND frame may be a null data packet (NDP) frame.

Here, the HNR frame may include information about HND frames received by each terminal.

Here, the HNR frame may include at least one of a medium access control (MAC) address, association ID (AID), and basic service set ID (BSSID) of a transmitting terminal that has transmitted the HND frame.

Here, the second restricted access window may start after the first restricted access window has ended.

Here, the second restricted access window may be configured such that the multiple terminals are allocated thereto in a sequence identical to a sequence of the multiple terminals allocated to the first restricted access window.

A hidden node detecting method according to another embodiment of the present invention to accomplish the other object includes receiving a beacon from an access point, acquiring a time slot allocated to the terminal based on setting information of a first restricted access window and setting intonation of a second restricted access window, which are included in the beacon, transmitting a hidden node detecting (HND) frame in a time slot of the first restricted access window, allocated to the corresponding terminal, and receiving an HND frame transmitted from another terminal in a time slot that is not allocated to the corresponding terminal, generating a hidden node reporting (HNR) frame including information about the received HND frame, and transmitting the HNR frame in a time slot of the second restricted access window, allocated to the corresponding terminal.

Here, the HND frame may be a null data packet (NDP) frame.

Here, the received HND frame may be received from a terminal belonging to a basic service set (BSS) identical to that of the corresponding terminal.

Here, the HNR frame may include at least one of a medium access control (MAC) address, association ID (AID), and basic service set ID (BSSID) of a transmitting terminal that has transmitted the HND frame.

Here, the second restricted access window may start after the first restricted access window has ended.

Here, the second restricted access window may be configured such that the multiple terminals are allocated thereto in a sequence identical to a sequence of the multiple terminals allocated to the first restricted access window.

According to the present invention, time slots allowing access to wireless channels are allocated to respective terminals so that the times at which the terminals can access the wireless channels are distributed, so that the frequency of occurrence of a hidden node problem may be decreased, and thus improving the usage efficiency of wireless channels via the decreased frequency.

Further, multiple terminals are allocated to a single time slot, and the usage efficiency of wireless channels may be improved, wherein the start times of time slots are set differently for respective terminals, thus alleviating a hidden node problem.

Furthermore, terminals in a hidden node relationship are detected among multiple terminals allocated to a single time slot, and the detected terminals are scheduled so that they do not simultaneously use a wireless channel, thus alleviating a hidden node problem.

In this way, when technology capable of alleviating a hidden node problem is applied to a WLAN system, the usage efficiency of wireless channels may be improved, so that unnecessary retransmission by a low-power terminal is prevented, thus reducing power consumption.

In addition, according to the present invention, terminals in a hidden node relationship may be detected.

Meanwhile, an access point that divides a service space into sectors and manage the sectors may set the sounding RAW field of restricted access window (RAW) parameter set (RPS) information so as to allocate a terminal to a specific sector so as to allocate a terminal to a specific sector. When a sounding RAW field is set, terminals included in RAW start association ID (AID) to RAW end AID should not transmit signals during a RAW, and may receive sector beacons transmitted for respective sectors while operating in a reception mode.

Each terminal may report received sector beacon ID information to an access point, and the access point may allocate terminals to a single specific sector, based on the reported information. A terminal located at a sector boundary may receive multiple sector beacons and may report the reception of the sector beacons. Even in this case, the access point must allocate the terminal to a single specific sector. At this time, the access point may check a hidden node relationship between terminals included in the sector by using a method for detecting a hidden node relationship according to an embodiment of the present invention, and may allocate the terminal to a sector having no hidden node relationship.

Meanwhile, when the access point provides the detected hidden node relationship to terminals, each of the terminals may manage a certain terminal, with which a direction link to the terminal itself cannot be set up in a hidden node relationship, in the form of a blacklist using the corresponding information. Therefore, the terminal may not attempt unnecessary tunneled direct-link setup (TDLS) or direct-link setup (DLS).

DETAILED DESCRIPTION OF EMBODIMENTS

Figure 1:
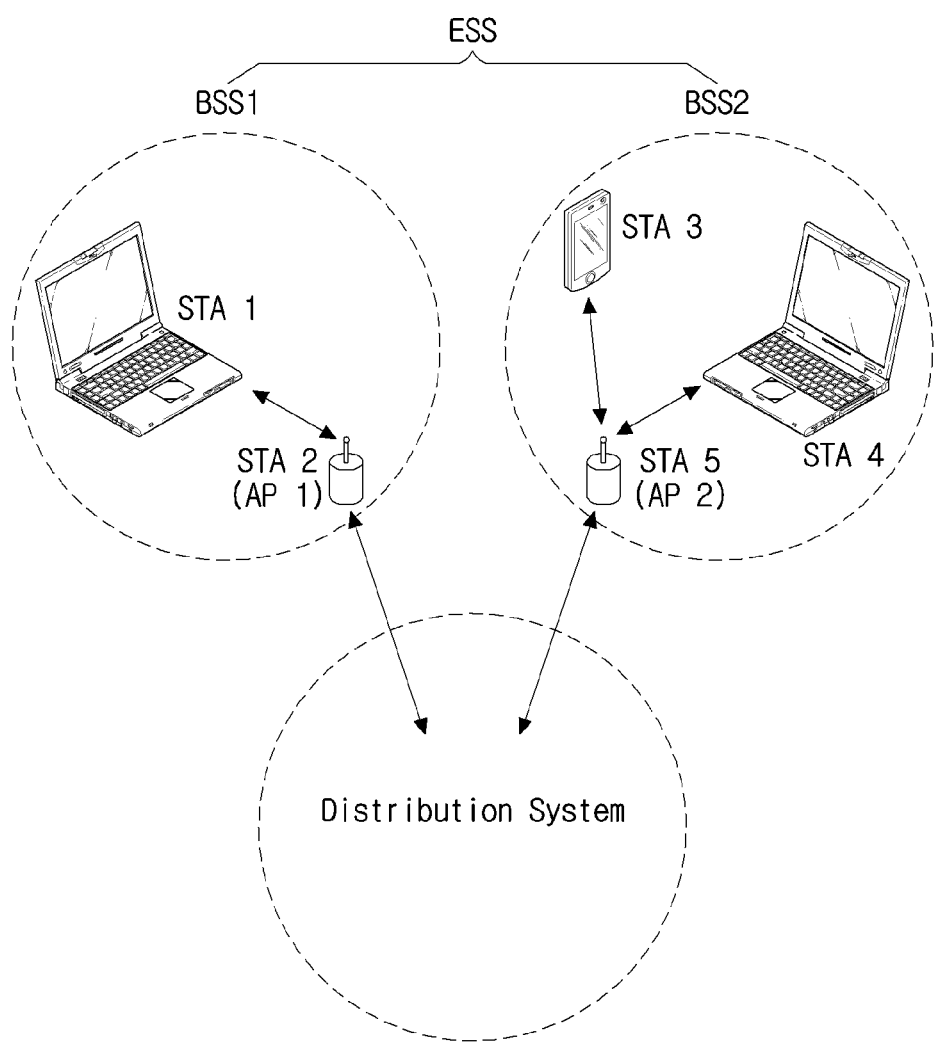
FIG. 1 is a conceptual diagram showing an embodiment of the configuration of an IEEE 802.11 WLAN system.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms such as "first" and "second" may be used to describe various components, but those components should not be limited by the terms. The terms are merely used to distinguish one component from other components. A first component may be designated as a second component and a second component may be designated as a first component in the similar manner, without departing from the scope based on the concept of the present invention. The term "and/or" includes a combination of a plurality of related items or any of the plurality of related items.

It should be understood that a representation indicating that a first component is "connected" or "coupled" to a second component may include the case where the first component is connected or coupled to the second component with some other component interposed therebetween, as well as the case where the first component is "directly connected" or "directly coupled" to the second component. In contrast, it should be understood that a representation indicating that a first component is "directly connected" or "directly coupled" to a second component means that no component is interposed between the first and second components.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The teams identical to those defined in generally used dictionaries should be interpreted as having meanings identical to contextual meanings of the related art, and are not interpreted as being ideal or excessively formal meanings unless they are definitely defined in the present specification.

Hereinafter, preferred embodiments of the present invention will be described in detail with reference to the attached drawings. For easy understanding of the entire part of the invention in the following description of the present invention, the same reference numerals are used to designate the same or similar elements throughout the drawings and repeated descriptions of the same components will be omitted.

Throughout the present specification, a station (STA) denotes any functional medium that includes medium access control (MAC) conforming to Institute of Electrical and Electronics Engineers (IEEE) 802.11 standards and a physical layer interface for a wireless medium. Stations may be classified into a station (STA) that is an access point (AP) and a station (STA) that is a non-AP. The station that is an AP may be simply called an access point (AP), and the station that is a non-AP may be simply called a terminal.

'Station (STA)' includes a processor and a transceiver, and may further include a user interface, a display device, etc. The processor denotes a unit devised to generate a frame to be transmitted over a wireless network or process a frame received over the wireless network, and may have various functions to control the station (STA). The transceiver denotes a unit that is functionally connected to the processor and that is devised to transmit and receive a frame over the wireless network for the station (STA).

'Access point (AP)' may denote a centralized controller, a base station (BS), a radio access station, node B, evolved node B, a mobile multihop relay (MMR)-BS, a base transceiver system (BTS), a site controller, etc., and may include some or all functions thereof.

'Terminal' may denote a wireless transmit/receive unit (WTRU), user equipment (UE), a user terminal (UT), an access terminal (AT), a mobile station (MS), a mobile terminal, a subscriber unit, a subscriber station (SS), a wireless device, a mobile subscriber unit, etc., and may include some or all functions thereof.

Here, the terminal may be implemented as a desktop computer enabling communication, a laptop computer, a tablet PC, a wireless phone, a mobile phone, a smart phone, a smart watch, smart glass, an e-book reader, a Portable Multimedia Player (PMP), a portable game console, a navigation device, a digital camera, a Digital Multimedia Broadcasting (DMB) player, a digital audio recorder, a digital audio player, a digital picture recorder, a digital picture player, a digital video recorder, a digital video player, or the like.

FIG. 1 is a conceptual diagram showing an embodiment of the configuration of an IEEE 802.11 WLAN system.

Referring to FIG. 1, the IEEE 802.11 WLAN system includes at least one basic service set (BSS). BSS denotes a set of stations (STA 1, STA 2 (AP 1), STA 3, STA 4, and STA 5 (AP 2)) that have been successfully synchronized with each other to be capable of communicating with each other, and is not a concept meaning a specific area.

The BSS may be classified into an infrastructure BSS and an independent BSS (IBSS), wherein BSS 1 and BSS 2 denote infrastructure BSSs. BSS 1 may include a terminal STA 1, an access point STA 2 (AP 1) for providing a distribution service, and a distribution system (DS) for connecting multiple access points STA 2 (AP 1) and STA 5 (AP 2) to each other. In BSS 1, the access point STA 2 (AP 1) may manage the terminal STA 1.

BSS 2 may include terminals STA 3 and STA 4, the access point STA 5 (AP 2) for providing a distribution service, and a distribution system for connecting the multiple access points STA 2 (AP 1) and STA 5 (AP 2) to each other. In BSS 2, the access point STA 5 (AP 2) may manage the terminals STA 3 and STA 4.

Meanwhile, IBSS is a BSS operating in an ad-hoc mode. Since IBSS does not include an access point, a centralized management entity is not present. That is, the terminals in IBSS are managed in a distributed manner. All terminals in IBSS may be implemented as mobile terminals and access to the distribution system (DS) is not allowed, thus forming a self-contained network.

The access points STA 2 (AP 1) and STA 5 (AP 2) may provide access to the distribution system (DS) via a wireless medium for terminals STA 1, STA 3, and STA 4 coupled thereto. Communication between the terminals STA 1, STA 3, and STA 4 in BSS 1 or BSS 2 is generally performed via the access point STA 2 (AP 1) or STA 5 (AP 2), but direct communication may be performed between the terminals STA 1, STA 3, and STA 4 when a direct link is set up therebetween.

Multiple infrastructure BSSs may be connected to each other via the distribution system (DS). Multiple BSSs connected via the DS may be referred to as an extended service set (ESS). Stations included in the ESS may communicate with each other, and a terminal may move from a single BSS to another BSS in the same ESS while performing seamless communication in the same ESS.

The distribution system (DS) is a mechanism for allowing a single access point to communicate with another access point, and in accordance with the DS, the access point may transmit frames for terminals coupled to a BSS managed thereby, or transmit frames for any terminal that has moved to another BSS. Further, the access point is capable of transmitting and receiving frames to and from an external network, such as a wired network. Such a DS is not necessarily a network and is not limited in its form as long as it is capable of providing a predetermined distribution service defined in the IEEE 802.11 standard. For example, the distribution system may be a wireless network such as a mesh network, or a physical structure for connecting the access points to each other.

A method for alleviating a hidden node problem according to an embodiment of the present invention, which will be described later, may be applied to the above-described IEEE 802.11 WLAN system, and may be applied not only to the IEEE 802.11 WLAN system, but also to various networks including the mobile Internet such as a wireless personal area network (WPAN), a wireless body area network (WBAN), wireless broadband Internet (Wibro), or world interoperability for microwave access (Wimax), a second generation (2G) mobile communication network such as a global system for mobile communication (GSM) or code division multiple access (CDMA), a 3G mobile communication network such as wideband code division multiple access (WCDMA) or cdma2000, a 3.5G mobile communication network such as high speed downlink packet access (HSDPA) or high speed uplink packet access (HSUPA), a 4G mobile communication network such as long term evolution (LTE) or LTE-Advanced, or a 5G mobile communication network.

Next, the Media Access Control (MAC) frame format of a WLAN system will be described below. MAC frames are chiefly classified into a data frame, a management frame, and a control frame. The data frame includes data to be transmitted to a terminal, and is transmitted from an upper layer to a terminal. The management frame is used to support an IEEE 802.11 service. The control frame is used to support the transmission of both the data frame and the management frame.

The management frame may refer to an association request frame, an association response frame, a reassociation request frame, a reassociation response frame, a probe request frame, a probe response frame, a beacon frame, an authentication frame, an action frame, etc.

The control frame may refer to a block acknowledgement (ACK) request frame, a block ACK frame, a power save (PS)-Poll frame, a request to send (RTS) frame, a clear to send (CTS) frame, an ACK frame, a contention free (CF)-End frame, etc.

Figure 2:
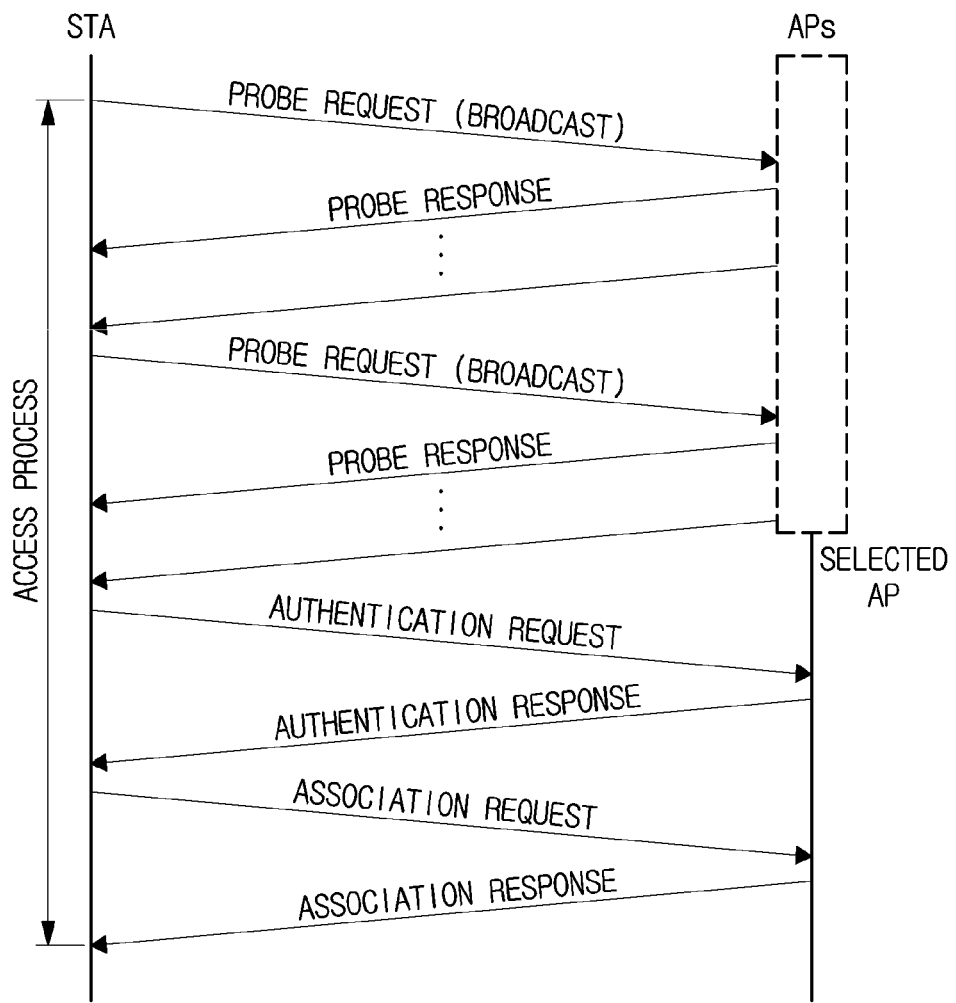
FIG. 2 is a conceptual diagram showing a terminal access procedure in an infrastructure BSS.

FIG. 2 is a conceptual diagram showing a terminal access procedure performed in an infrastructure BSS.

To transmit and receive data in the infrastructure BSS, a terminal STA must primarily access an access point (AP).

Referring to FIG. 2, a terminal (STA) access procedure in the infrastructure BSS is chiefly divided into 1) the step of probing an AP (probe step), 2) the step of pertaining authentication with the probed AP (authentication step), and 3) the step of associating with the authenticated AP (association step).

The terminal STA may probe neighboring APs via a probe process. The probe process is divided into a passive scanning method and an active scanning method. The passive scanning method may be performed by overhearing beacons transmitted from neighboring APs. Meanwhile, the active scanning method may be performed by broadcasting a probe request frame. The AP that has received the probe request frame may transmit a probe response frame corresponding to the probe request frame to the corresponding terminal STA. The terminal STA may recognize the existence of the neighboring APs by receiving the probe response frame.

Thereafter, the terminal (STA) performs an authentication procedure with each probed access point (AP), wherein authentication with probed multiple APs may be performed. Authentication algorithms conforming to the IEEE 802.11 standard may be classified into an open system algorithm for exchanging two authentication frames with each other and a shared key algorithm for exchanging four authentication frames with each other. Via the procedure for exchanging the authentication request frame and the authentication response frame based on the authentication algorithm, the terminal (STA) may perform authentication with the access point (AP).

Finally, the terminal (STA) may select a single AP from among the authenticated multiple APs, and perform the procedure for associating with the selected AP. That is, the terminal (STA) transmits an association request frame to the selected AP, and the AP that has received the association request frame transmits an association response frame corresponding to the association request frame to the corresponding terminal (STA). In this way, the terminal (STA) may perform the procedure for associating with the AP via the procedure for exchanging the association request frame and the association response frame with the AP.

Figure 3:
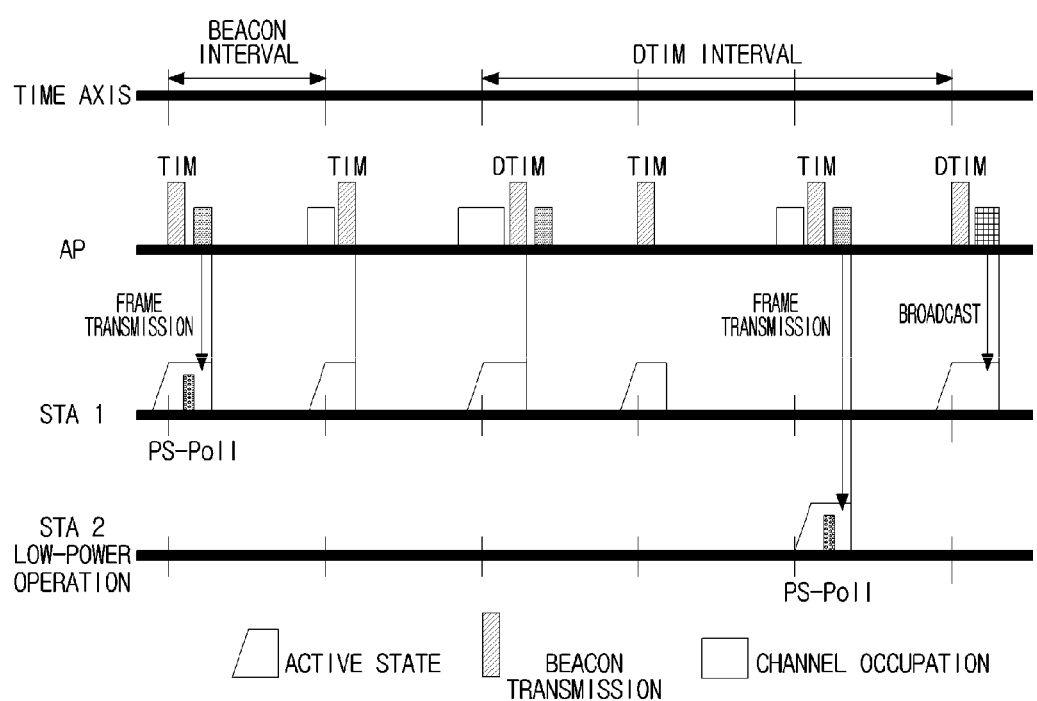
FIG. 3 is a conceptual diagram showing an embodiment of a data transfer procedure in an access point.

FIG. 3 is a conceptual diagram showing an embodiment of a data transmission procedure performed by an AP.

Referring to FIG. 3, the AP periodically broadcasts a beacon, and may broadcast a beacon including a delivery traffic indication message (DTIM) at an interval of three beacons. Terminals STA 1 and STA 2 being in a power save mode (PSM) periodically awake to receive beacons, check a traffic indication map (TIM) or a DTIM included in each beacon, and then determine whether data to be transmitted thereto is buffered in the AP. If it is determined that the buffered data is present, the terminals STA 1 and STA 2 are maintained in an awake state to receive data from the AP, whereas if it is determined that the buffered data is not present, the terminals STA 1 and STA 2 return to a power save state (i.e. a doze state).

That is, when a bit in the TIM corresponding to its own AID is set to 1, each of the terminals STA 1 and STA 2 transmits a PS-Poll frame (or a trigger frame), indicating that it is already awake and is ready to receive data, to the AP. The AP may recognize that each of the terminals STA 1 and STA 2 is ready to receive data by receiving the PS-Poll frame (or the trigger frame), and transmit data or ACK to each of the terminals STA 1 and STA 2. When the ACK is transmitted to the terminal STA 1 or STA 2, the AP may transmit data to the terminal STA 1 or STA 2 at suitable time. In contrast, when a bit in the TIM corresponding to its own AID is set to '0', the terminal STA 1 or STA 2 returns to a power save state.

In the WLAN system, the terminal conforms to a carrier sensing multiple access (CAMA)/collision avoidance (CA) manner to access a wireless channel. That is, the terminal may first check the occupied state of a wireless channel before accessing the wireless channel. Checking the occupied state of the wireless channel may be performed by channel sensing that detects whether energy of a predetermined level or more is present in the wireless channel.

At this time, when energy of a predetermined level or more is detected and it is determined that another terminal has already occupied the wireless channel, the terminal may wait for a random backoff time, and then perform channel sensing again. In contrast, when energy of a predetermined level or less is detected and it is determined that the corresponding channel is in an idle state, the terminal may access the corresponding channel and transmit signals.

Even if a first transmitting terminal transmits a signal and a wireless channel is occupied, when a second transmitting terminal erroneously determines the wireless channel to be in an idle state and transmits a signal through the wireless channel, a collision between the two signals occurs, so that a receiving terminal cannot normally receive the two signals. In this case, the transmitting terminals attempt to retransmit the signals due to a failure in transmission, thus deteriorating the efficiency of the wireless channel. This phenomenon is referred to as a 'hidden node problem' in the WLAN system.

Figure 4:
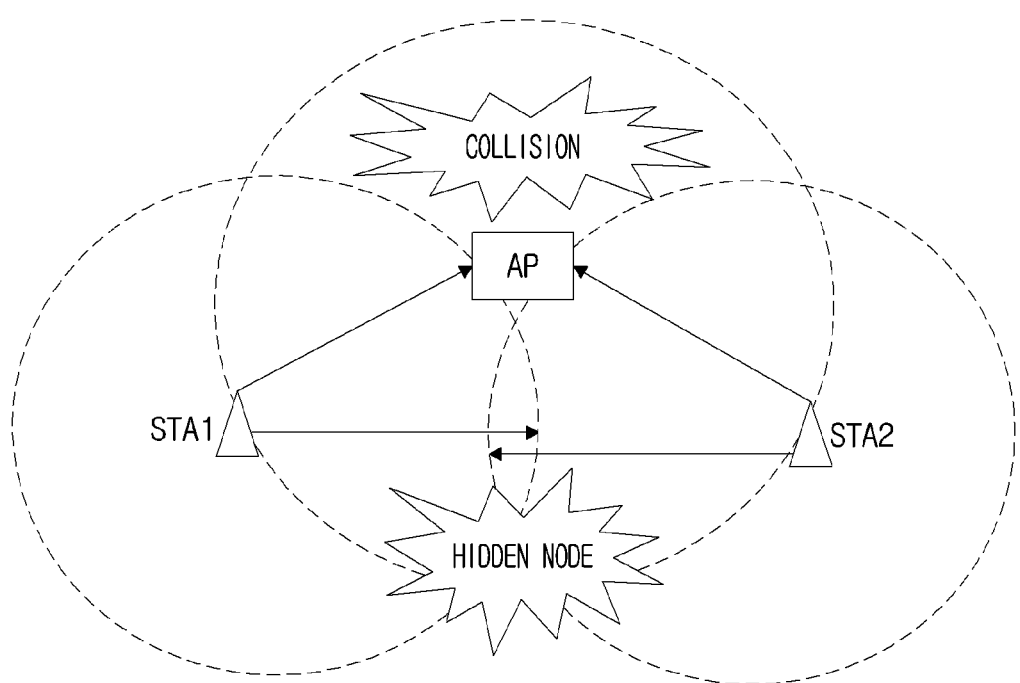
FIG. 4 is a conceptual diagram showing a hidden node problem occurring between terminals.

FIG. 4 is a conceptual diagram showing a hidden node problem occurring between terminals.

Referring to FIG. 4, a hidden node problem generally occurs between terminals STA 1 and STA 2 located at the boundaries of cells opposite each other around an AP. That is, when a first terminal STA 1 and a second terminal STA 2 have a hidden node relationship, the first terminal STA 1 can receive a signal transmitted from the AP, but cannot receive a signal transmitted from the second terminal STA 2, and the second terminal STA 2 can receive a signal transmitted from the AP, but cannot receive a signal transmitted from the first terminal STA 1.

In this case, since the first terminal STA 1 and the second terminal STA 2 do not know the existence of each other, there may occur the case where the first terminal STA 1 and the second terminal STA 2 simultaneously transmit signals. Here, a collision between two signals occurs, and thus the AP can receive neither of the two signals.

In such a wireless environment, it is impossible for each terminal to determine whether the other terminal has transmitted a signal, regardless of channel sensing performance. In particular, in a WLAN system composed of thousands of sensor terminals (i.e. low-power terminals), multiple sensor terminals having a hidden node relationship may be present, so that a signal collision between the sensor terminals and retransmission caused by the signal collision frequently occur, thus rapidly deteriorating the efficiency of the wireless channel.

Figure 5:
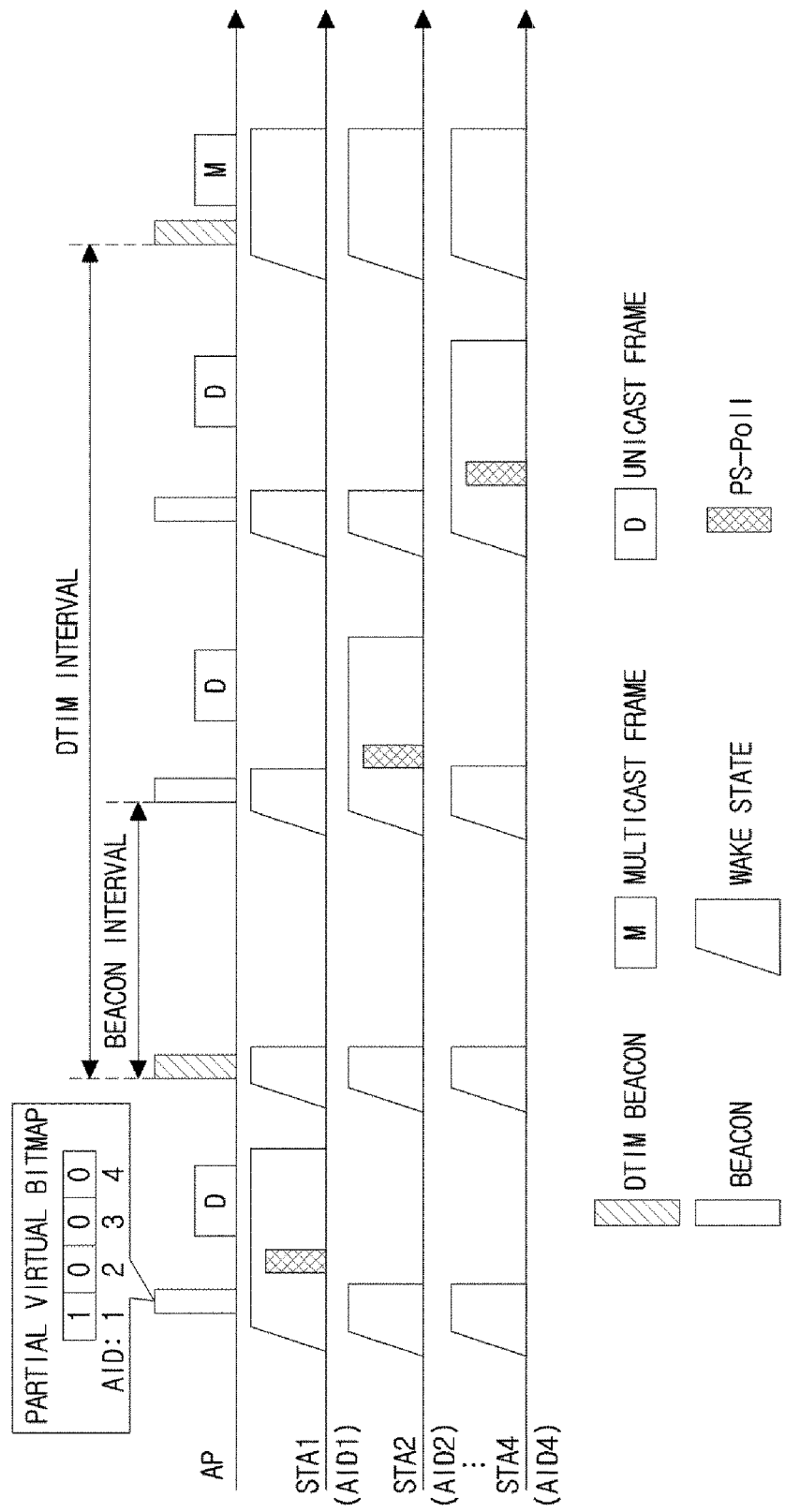
FIG. 5 is a conceptual diagram showing a power save mode in a WLAN system.

FIG. 5 is a conceptual diagram showing a power save mode in a WLAN system.

Referring to FIG. 5, the access point (AP) may broadcast beacons at beacon intervals, and terminals STA 1, STA 2, . . . , STA 4 being in a power save state may periodically awake to receive beacons transmitted from the AP. Here, such a beacon may include information (i.e. TIM) indicating whether data heading toward the specific terminals STA 1, STA 2, . . . , STA 4 is buffered in the AP.

Next, a TIM information element (IE) included in a beacon will be described below.

Figure 6:
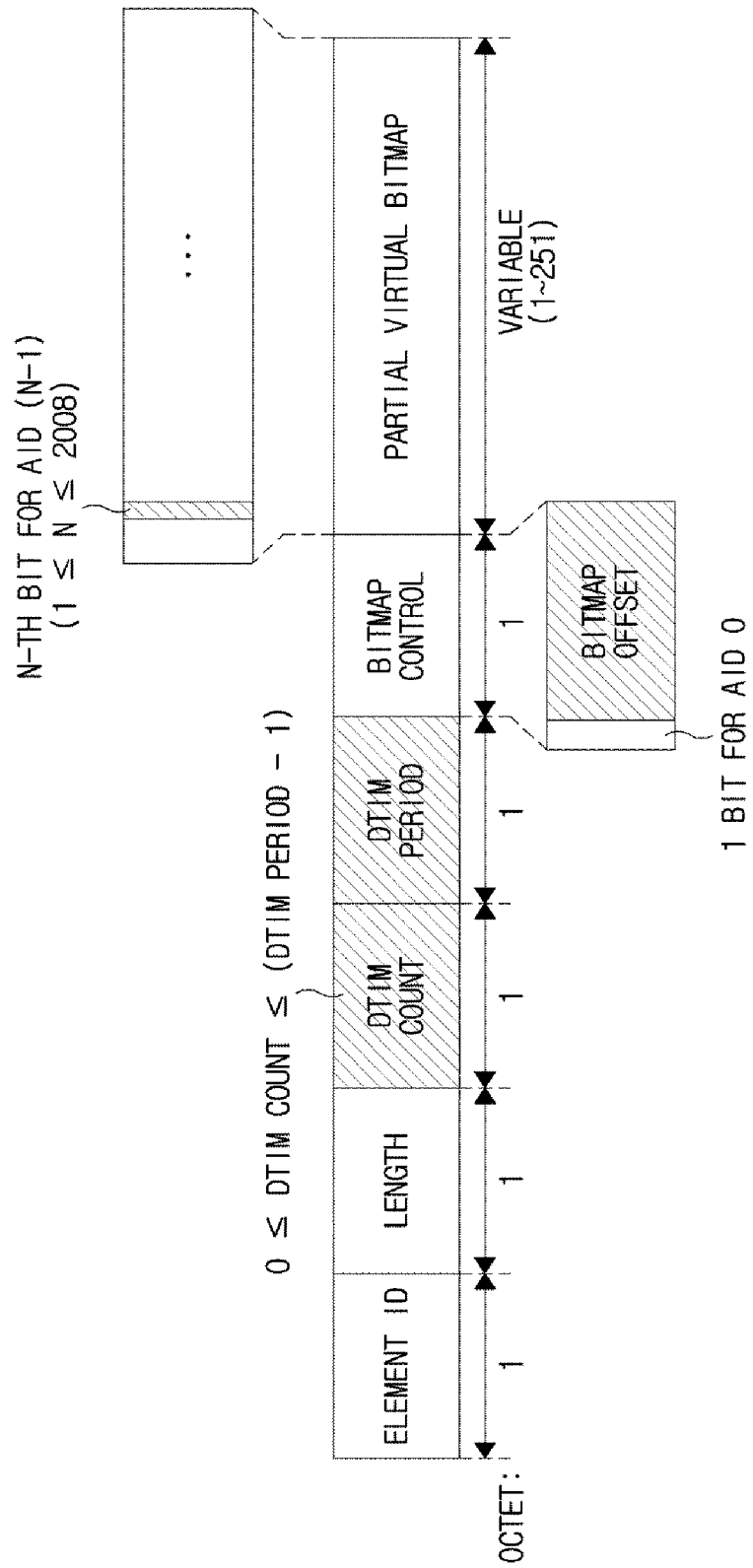
FIG. 6 is a conceptual diagram showing the structure of a TIM IE included in a beacon frame.

FIG. 6 is a conceptual diagram showing the structure of a TIM IE included in a beacon frame.

Referring to FIG. 6, the TIM IE may include an element ID field, a length field, a DTIM count field, a DTIM period field, a bitmap control field, and a partial virtual bitmap field. Here, the bitmap control field may include a 1 bit for AID 0 and a bitmap offset. The partial virtual bitmap field may include information indicating a terminal which will receive data buffered in the AP.

Referring back to FIG. 5, each of the terminals STA 1, STA 2, . . . , STA 4 that receive beacons may determine that data to be transmitted thereto is buffered in the AP by checking a bit corresponding to its own AID in a bitmap control field and a partial virtual bitmap field which are included in the TIM IE. If the data to be transmitted to the terminal itself is buffered in the AP, each of the terminals STA 1, STA 2, . . . , STA 4 may notify the AP that it is ready to receive data by transmitting a PS-Poll frame to the AP.

When the PS-Poll frame is received from each of the terminals STA 1, STA 2, . . . , STA 4, the AP may transmit the buffered data to the corresponding terminal. The terminal STA 1, STA 2, . . . , STA 4 operating in a power save mode may awake every beacon in which a DTIM count becomes 0 depending on a DTIM period and may check the TIM IE, without awaking in all beacon periods and checking the TIM IE.

The AP may simultaneously set bits corresponding to multiple terminals STA 1, STA 2, . . . , STA 4 in the partial virtual bitmap field. In this case, immediately after receiving beacon frames, the terminals STA 1, STA 2, . . . , STA 4 contend with each other to access a wireless channel in order to transmit PS-Poll frames. At this time, the transmission of PS-Poll frames from the multiple terminals STA 1, STA 2, ..., STA 4 is simultaneously attempted within a short period of time. In particular, when there are many terminals STA 1, STA 2, ... STA 4 having a hidden node relationship, a problem arises in that a collision between PS-Poll frames and retransmission caused by such a collision repeatedly occur.

Figure 7:
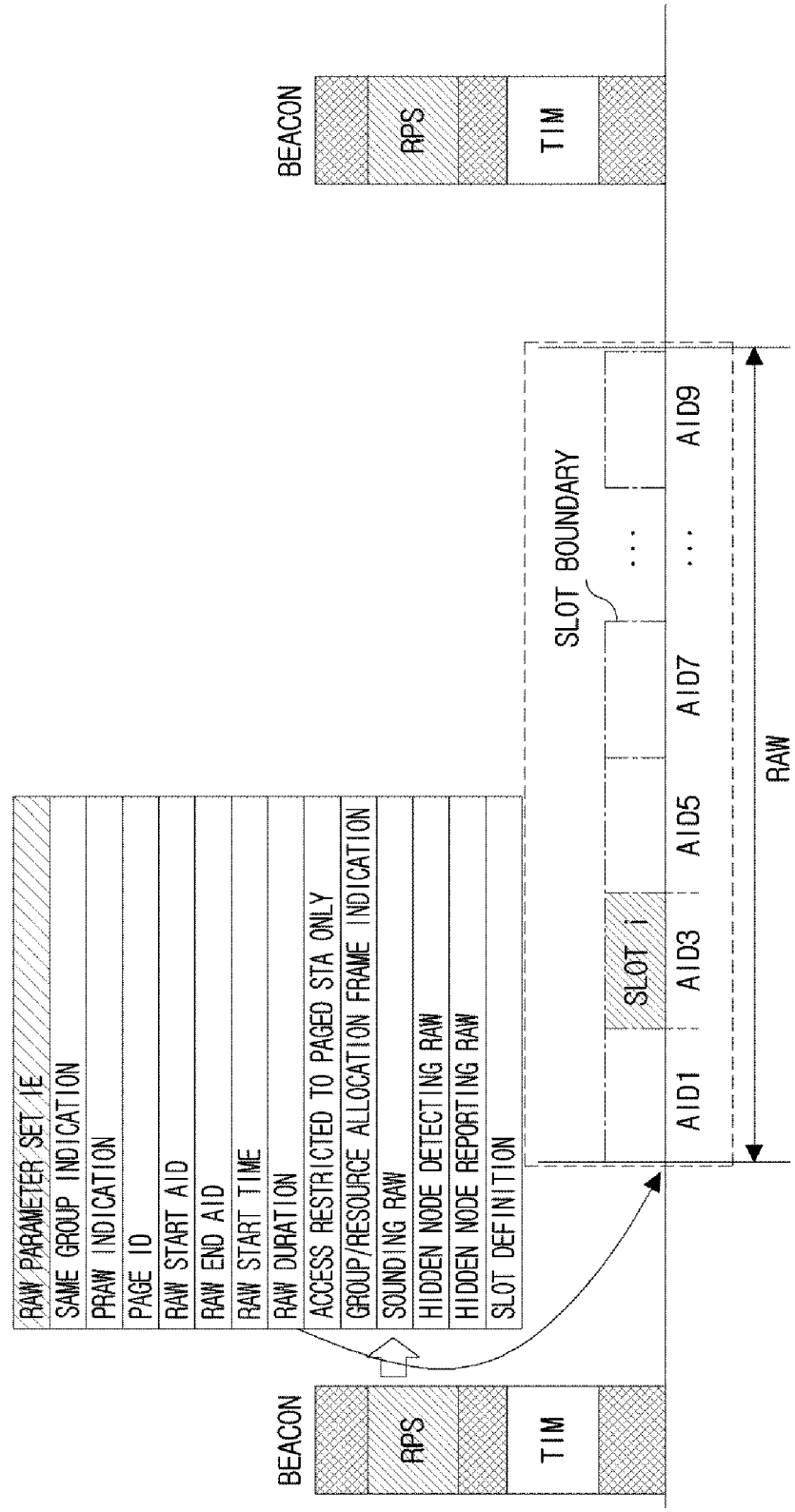
FIG. 7 is a conceptual diagram showing a restricted access window-based scheduling method.

FIG. 7 is a conceptual diagram showing a restricted access window (RAW)-based scheduling method.

Referring to FIG. 7, the access point (AP) may generate a beacon including RAW parameter set (RPS) information to implement the scheduling of terminals. The RPS may include a same group indication field, a periodic RAW (PRAW) indication field, a page ID field, a RAW start AID field, a RAW end AID field, a RAW start time field, a RAW duration field, a field for access restricted to paged STA only, a group/resource allocation frame indication field, a sounding RAW field, a slot definition field, etc. The RPS may further include a hidden node detecting RAW field, a hidden node reporting RAW field, etc.

The AP may define the interval of a RAW as a RAW duration ranging from the RAW start time, and may permit channel access by a designated terminal group between a RAW start AID and a RAW end AID in a page ID. The AP may divide the RAW into multiple time slots depending on the slot definition field, and allocate terminals belonging to a group designated in the corresponding RAW to respective time slots.

A single time slot may have a uniform length, and at least one terminal may be allocated to a single time slot. The method for allocating a terminal to a time slot may be performed in such a way as to separately define a time slot in the slot definition field or to allow the terminal to infer a time slot by itself in conformity with a predetermined rule using the AID location information of the terminal.

Figure 8:
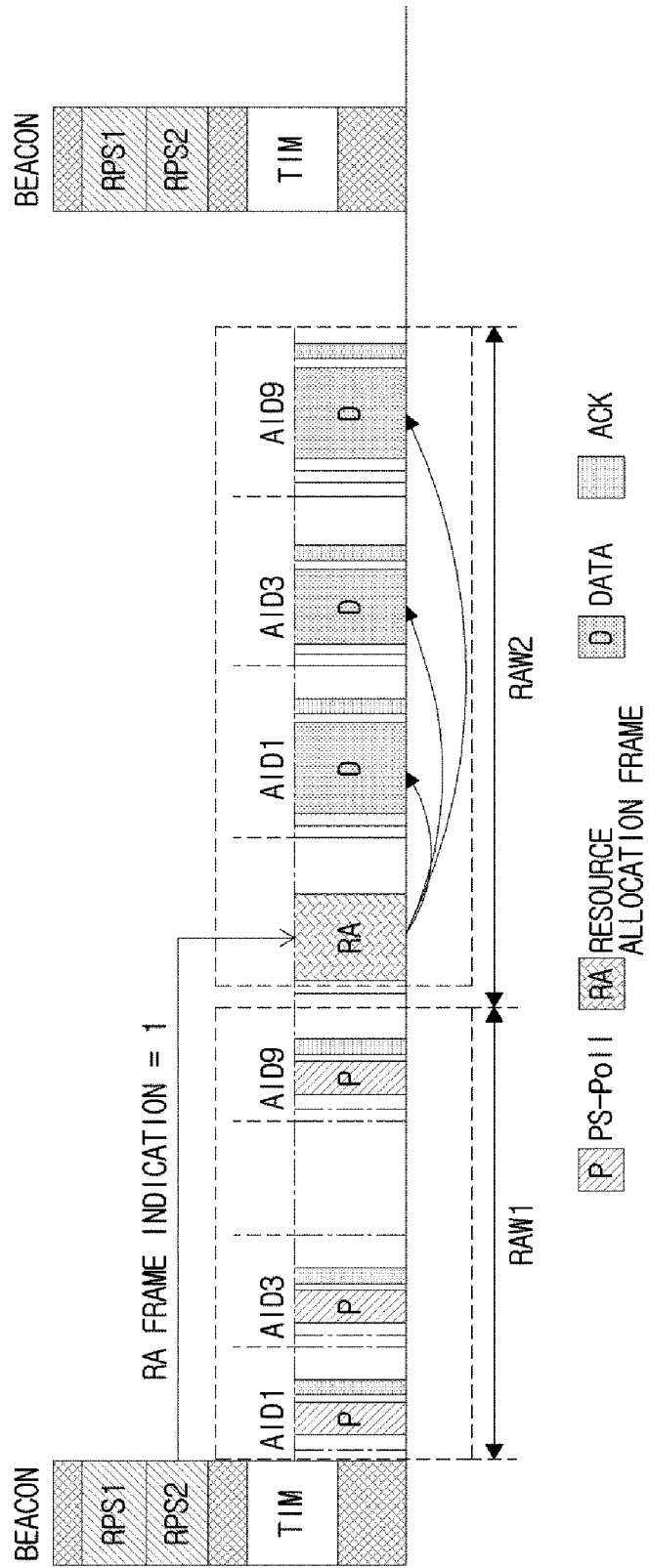
FIG. 8 is a conceptual diagram showing a continuous RAW-based scheduling method.

FIG. 8 is a conceptual diagram showing a continuous RAW-based scheduling method.

Referring to FIG. 8, the AP may generate a beacon including multiple RPSs (i.e. RPS 1 and RPS 2). That is, the AP may set a continuous RAW using RPS 1 and RPS 2. In this case, the AP may indicate that the terminal group of RPS 2 is identical to a terminal group designated by previous RPS1, using the same group indication field included in the RPS2, and may generate RPS2 in which a RAW start AID, an RAW end AID, etc. are omitted, by means of such same group indication field.

The group/resource allocation frame indication field may indicate that a group/resource allocation frame (i.e. RA frame) indicating separate time slot allocation information will be received at the start time of a RAW. By means of such a RAW setting scheme, the AP may allocate a time slot for the transmission of a PS-Poll frame to the terminal during RAW 1, and may allocate a time slot only to the terminal that has transmitted the PS-Poll frame so that actual data may be transmitted during RAW 2.

As described above, when terminals are scheduled to access a channel in a certain time slot, the terminals that simultaneously access the channel immediately after a beacon frame has been received are temporally distributed, and thus the problems of channel access contention and a frame collision may be alleviated by means of temporal distribution.

However, if only a single terminal is allocated to a single time slot, when the terminal allocated to a specific time slot is maintained in a power save state and the corresponding time slot is not used, the time slot is wasted, thus deteriorating the efficiency of channel use. To improve the efficiency of channel use, multiple terminals may be allocated to a single time slot.

Figure 9:
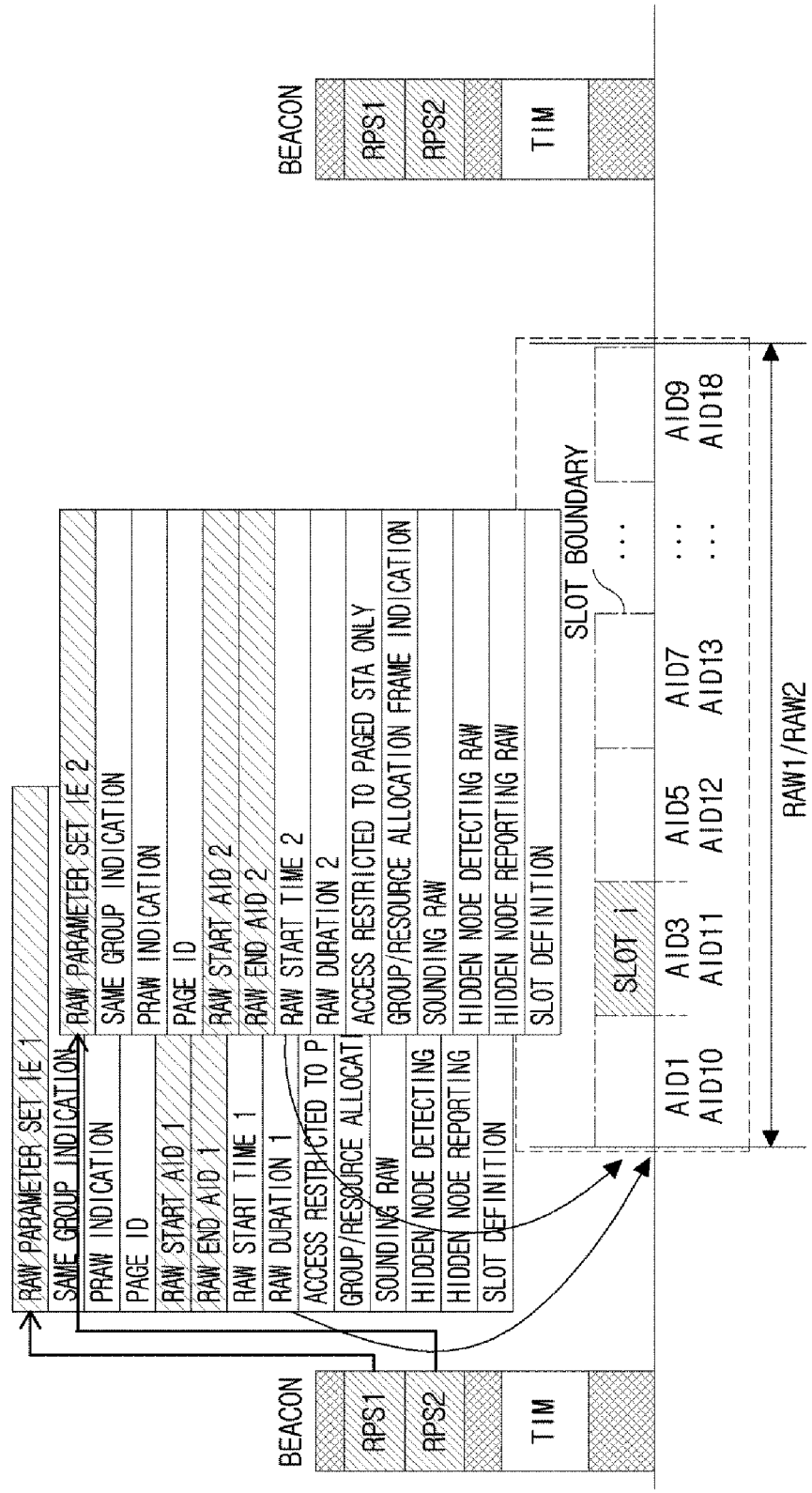
FIG. 9 is a conceptual diagram showing an overlapping RAW-based scheduling method.

FIG. 9 is a conceptual diagram showing an overlapping RAW-based scheduling method.

Referring to FIG. 9, an access point (AP) may generate a beacon including multiple RPSs (i.e. RPS 1 and RPS 2). That is, the AP may allocate multiple terminals to the same time slot by differently setting only an interval defined by the RAW start AID and the RAW end AID in RPS 1 and RPS 2.

However, when multiple terminals are allocated to a single time slot, if the multiple terminals have a hidden node relationship, a collision in frame transmission may continuously occur in the corresponding time slot.

Figure 10:
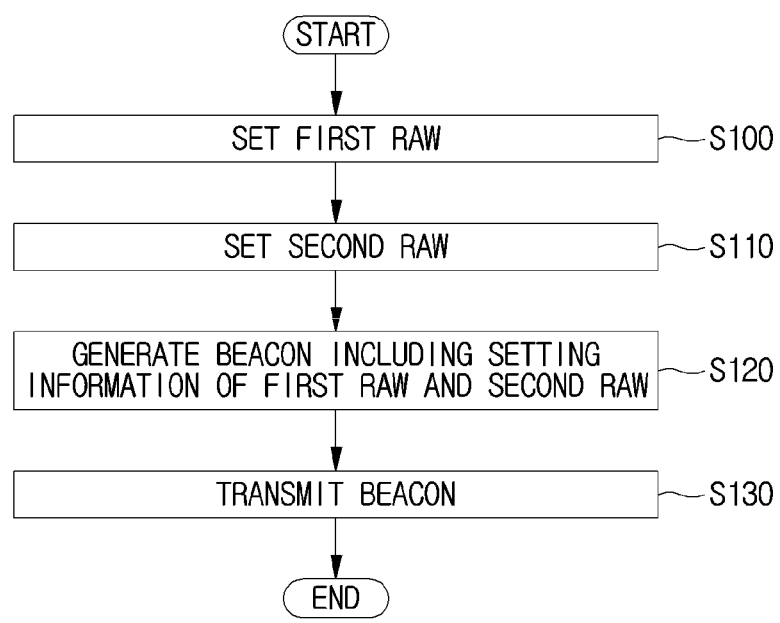
FIG. 10 is a flowchart showing a method for setting a restricted access window according to an embodiment of the present invention.
Figure 11:
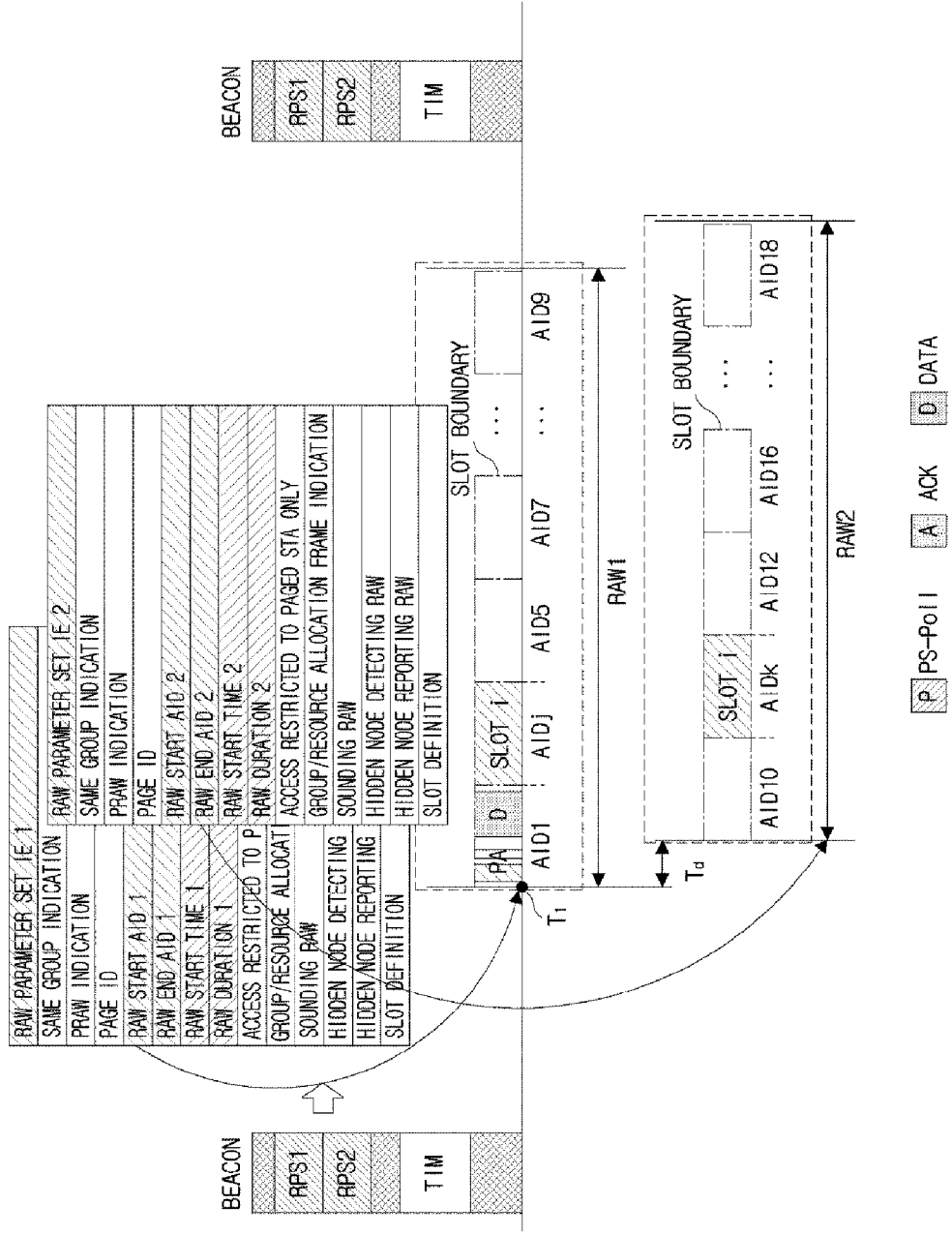
FIG. 11 is a conceptual diagram showing a method for setting a restricted access window according to the embodiment of the present invention.

FIG. 10 is a flowchart showing a restricted access window according to an embodiment of the present invention, and FIG. 11 is a conceptual diagram showing a restricted access window setting method according to the embodiment of the present invention.

Referring to FIGS. 10 and 11, an access point (AP) may set a first restricted access window (RAW 1) (S100). The first RAW (RAW 1) may start from first time $T_1$ in an interval between beacons (beacon interval), and may be used for channel access for a first terminal group including at least one terminal. The first RAW (RAW 1) may include at least one time slot, and different terminals may be allocated to respective time slots.

The setting information RPS 1 of the first RAW (RAW 1) may include a same group indication field, a PRAW indication field, a page ID field, a RAW start AID 1 field, a RAW end AID 1 field, a RAW start time 1 field, a RAW duration 1 field, a field for access restricted to paged STA only, a group/resource allocation frame indication field, a sounding RAW field, a slot definition field, etc. The setting information RPS1 of RAW 1 may further include a hidden node detecting RAW field, a hidden node reporting RAW field, etc.

In this case, when the RAW start AID 1 field is AID 1, and the RAW end AID 1 field is AID 9, the AP may allocate terminals ranging from a terminal having an AID of 1 to a terminal having an AID of 9 to the respective time slots.

The AP may set a second RAW (RAW 2) (S110). The second RAW (RAW 2) may start from a second time $(T_1+T_d)$ that is the time corresponding to a predefined time $T_d$ after the first time $T_1$ in the beacon interval, and may be used for channel access for a second terminal group including at least one terminal. The second RAW (RAW 2) may include at least one time slot, and different terminals may be allocated to respective time slots. The first RAW (RAW 1) and the second RAW (RAW 2) may overlap each other from the second time $T_1+T_d$. That is, the time slot included in the first RAW (RAW 1) may overlap the time slot included in the second RAW (RAW 2).

The predefined time $T_d$ may have a value that is greater than the sum of the length of a PS-Poll frame (i.e. the time during which the PS-Poll frame is transmitted) and the length of distributed interframe space (DIFS), and that is less than the length of a time slot (i.e. the time during which the time slot is transmitted).

The second terminal group may include terminals other than the terminal included in the first terminal group, and may have priority lower than that of the first terminal group. That is, when it is desired to designate the priority of a specific terminal group to be high, the AP may allocate the specific terminal group to a RAW having the earliest RAW start time. For example, when it is desired to designate the priority of the first terminal group to be high, the AP may allocate the first terminal group to the first RAW (RAW 1).

The setting information RPS 2 of the second RAW (RAW 2) may include a same group indication field, a PRAW indication field, a page ID field, a RAW start AID 2 field, a RAW end AID 2 field, a RAW start time 2 field, a RAW duration 2 field, a field for access restricted to paged STA only, a group/resource allocation frame indication field, a sounding RAW field, a slot definition field, etc. The setting information RPS 2 of RAW 2 may further include a hidden node detecting RAW field, a hidden node reporting RAW field, etc.

Here, when the RAW start AID 2 field is AID 10 and the RAW end AID 2 field is AID 18, the AP may allocate terminals ranging from a terminal having an AID of 10 to a terminal having an AID of 18 to respective time slots.

RAW start time 2 may be defined by the following Equation 1:

$$RAW\ start\ time\ 2 = RAW\ start\ time\ 1 + predefined\ time\ (T_d) \quad \text{Equation 1}$$

The AP may generate a beacon including the setting information RPS 1 of the first RAW (RAW 1) and the setting information RPS 2 of the second RAW (RAW 2) (S120), and transmit the generated beacon (S130).

As described above, the start time of the second RAW (RAW 2) may be set to the time that is the predefined time $T_d$ after the start time $T_1$ of the first RAW (RAW 1). As a result, even if a tenth terminal (i.e. a terminal having an AID of 10) allocated to the first time slot of the second RAW (RAW 2) has a hidden node relationship with a first terminal (i.e. a terminal having an AID of 1) allocated to the first time slot of the first RAW (RAW 1), the time at which the PS-Poll frame is transmitted from the first terminal is avoided, thus preventing a collision between PS-Poll frames from occurring.

That is, the frame transmitted after the transmission of the PS-Poll frame from the first terminal is ACK or data frame transmitted from the AP, and the tenth terminal and the AP are not in a hidden node relationship, and thus the tenth terminal may perform channel access contention after the AP has completed the transmission of frames.

Meanwhile, the tenth terminal may awake before the start point $(T_1+T_d)$ of the first time slot in the second RAW (RAW 2). For example, the tenth terminal may awake at the start time $T_1$ of the first time slot of the first RAW (RAW 1), which overlaps the first time slot of the second RAW (RAW 2) (i.e. time corresponding to $T_d$ before the start point of its own time slot). When the tenth terminal awakes at the start point $T_1$ of the first time slot of the first RAW (RAW 1), the tenth terminal may determine whether there is the transmission/reception of a frame between another terminal and the AP in the first time slot of the first RAW (RAW 1). By way of this determination, the tenth terminal may determine the transmission/reception of a frame in the first time slot of the first RAW (RAW 1) even if any terminal having a hidden node relationship with the tenth terminal transmits and receives a frame in the first time slot of RAW 1.

Figure 12:
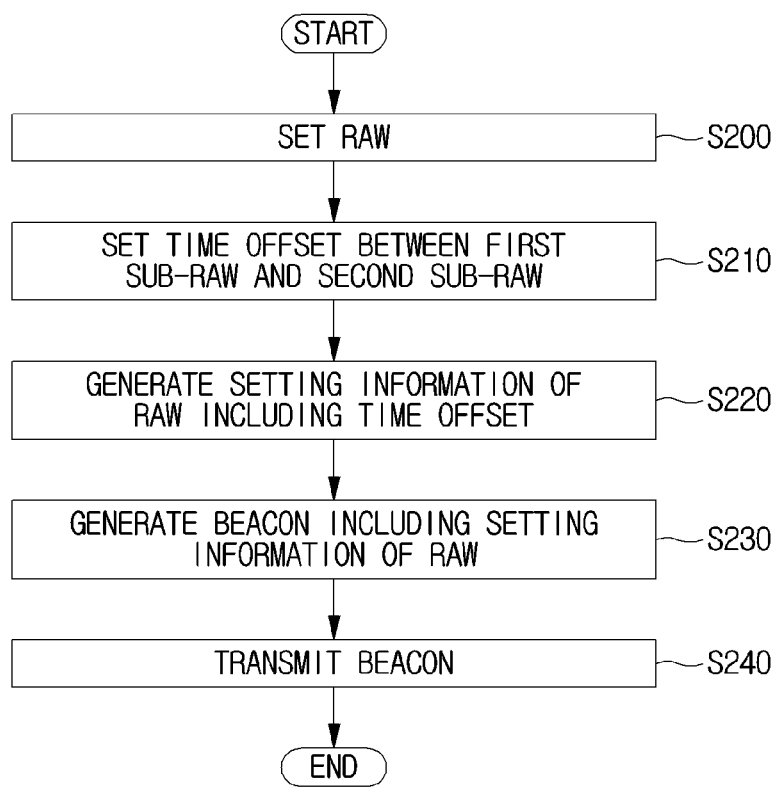
FIG. 12 is a flowchart showing a method for setting a restricted access window according to another embodiment of the present invention.
Figure 13:
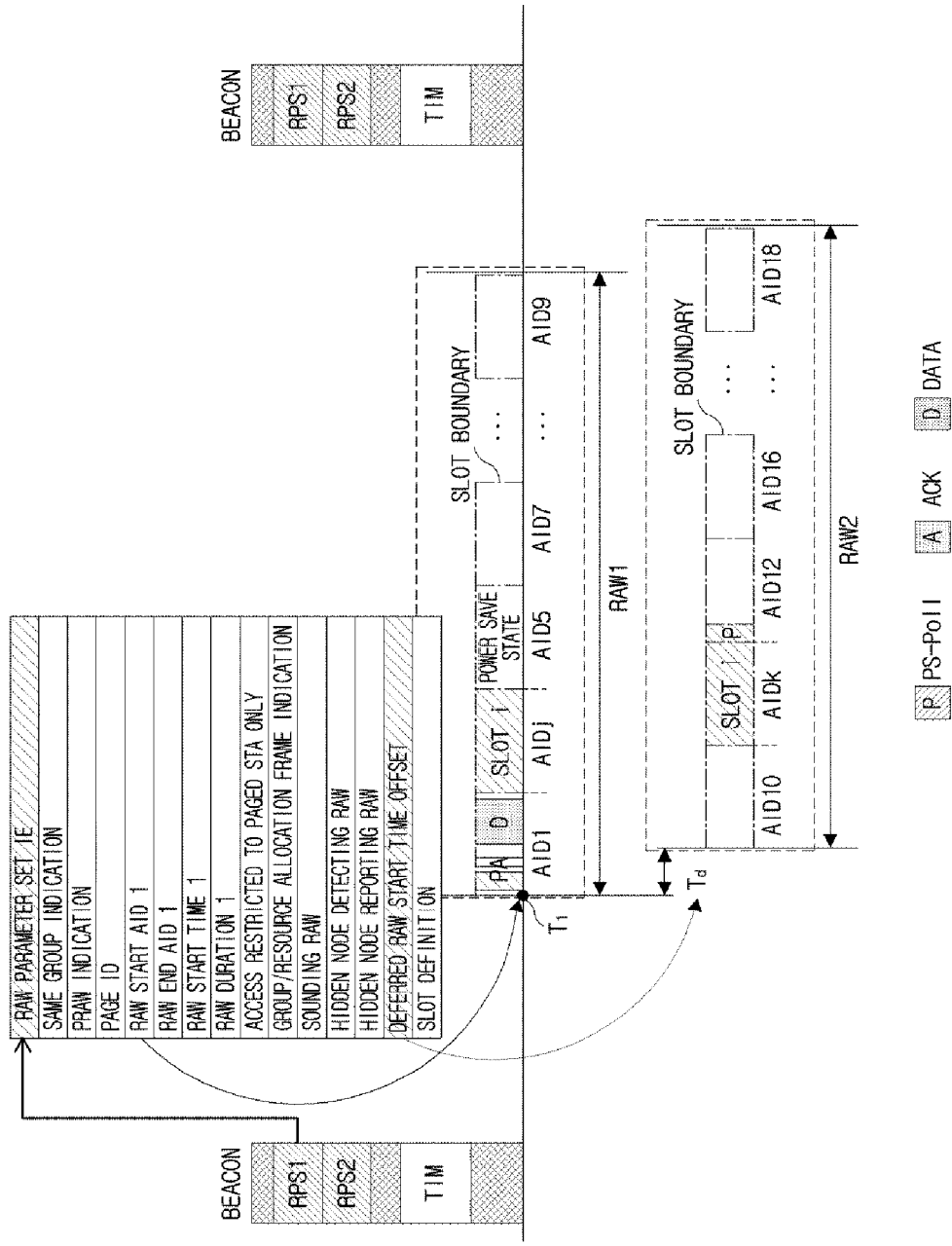
FIG. 13 is a conceptual diagram showing a method for setting a restricted access window according to the other embodiment of the present invention.

FIG. 12 is a flowchart showing a restricted access window (RAW) setting method according to another embodiment of the present invention, and FIG. 13 is a conceptual diagram showing a RAW setting method according to the other embodiment of the present invention.

Referring to FIGS. 12 and 13, the access point (AP) may set a RAW (S200). The RAW is located in an interval between beacons (beacon interval) and may be used for channel access between terminals.

The AP may set a time offset between a first sub-RAW (RAW 1) and a second sub-RAW (RAW 2) which are included in the RAW (S210).

The first sub-RAW (RAW 1) may start from a first time $T_1$ in an interval between beacon frames, and may be used for channel access for a first terminal group including at least one terminal. The first sub-RAW (RAW 1) may include at least one time slot, and different terminals may be allocated to respective time slots.

The second sub-RAW (RAW 2) may start from a second time $(T_1+T_d)$ corresponding to the time offset $T_d$ after the first time $T_1$ in the beacon frame interval, and may be used for channel access for a second terminal group including at least one terminal. The second sub-RAW (RAW 2) includes at least one time slot, and different terminals may be allocated to respective time slots. The first sub-RAW (RAW 1) and the second sub-RAW (RAW 2) may overlap each other from time indicated by the time offset. That is, the time slot included in the first sub-RAW (RAW 1) may overlap the time slot included in the second sub-RAW (RAW 2).

The time offset $T_d$ may have a value that is greater than the sum of the length of a PS-Poll frame (i.e. the time for which the PS-Poll frame is transmitted) and the distributed inter-frame space (DIFS) and that is less than the length of the time slot (i.e. the length for which the time slot is transmitted).

The second terminal group may include terminals other than the terminal included in the first terminal group, and may have priority less than that of the first terminal group. That is, when it is desired to designate the priority of a specific terminal group to be high, the AP may allocate the specific terminal group to a sub-RAW having the earliest RAW start time. For example, when it is desired to designate the priority of the first terminal group to be high, the AP may allocate the first terminal group to the first sub-RAW (RAW 1).

The AP may generate the setting information of the RAW including a time offset (S220).

The setting information RPS of the RAW may include a same group indication field, a PRAW indication field, a page ID field, a RAW start AID 1 field, a RAW end AID 1 field, a RAW start time 1 field, a RAW duration 1 field, a field for access restricted to paged STA only, a group/resource allocation frame indication field, a sounding RAW field, a slot definition field, a deferred RAW start time offset field, etc. The setting information RPS of the RAW may further include a hidden node detecting RAW field, a hidden node reporting RAW field, etc.

Here, the case where the deferred RAW start time offset field is set to a certain value other than 0 means that the RAW is composed of multiple sub-RAWs, wherein the start time of each sub-RAW has a time offset corresponding to the certain value. The slot definition field may include information about a terminal group to be allocated to each sub-RAW or may include information about a terminal to be allocated to the time slot of each sub-RAW.

The AP may generate a beacon including the setting information of the RAW (S230), and may transmit the generated beacon (S240).

As described above, the start point of the second sub-RAW (RAW 2) is set to the time that is the predefined time $T_d$ after the start time $T_1$ of the first sub-RAW (RAW 1). Accordingly, even if a tenth terminal (i.e. a terminal having an AID of 10) allocated to the first time slot of the second sub-RAW (RAW 2) has a hidden node relationship with the first terminal (i.e. a terminal having an AID of 1) allocated to the first time slot of the first sub-RAW (RAW 1), the time at which the PS-Poll frame is transmitted from the first terminal is avoided, thus preventing a collision between PS-Poll frames from occurring.

Meanwhile, the tenth terminal may awake before the start point ($T_1+T_d$) of the first time slot in the second sub-RAW (RAW 2). For example, the tenth terminal may awake at the start time $T_1$ of the first time slot of the first sub-RAW (RAW 1), which overlaps the first time slot of the second sub-RAW (RAW 2) (i.e. time corresponding to $T_d$ before the start point of its own time slot). When the tenth terminal awakes at the start point $T_1$ of the first time slot of the first sub-RAW (RAW 1), the tenth terminal may determine whether there is the transmission/reception of a frame between another terminal and the AP in the first time slot of the first sub-RAW (RAW 1). By way of this determination, the tenth terminal may determine the transmission/reception of a frame in the first time slot of the first sub-RAW (RAW 1) even if any terminal having a hidden node relationship with the tenth terminal transmits and receives a frame in the first time slot of RAW 1.

In addition, when a fifth terminal (i.e. a terminal having an AID of 5) allocated to the third time slot of the first sub-RAW (RAW 1) is in a power save mode, a twelfth terminal (that is, a terminal having an AID of 12) allocated to the third time slot of the second sub-RAW (RAW 2) may transmit a PS-Poll frame, thus preventing the time slot from being wasted.

Figure 14:
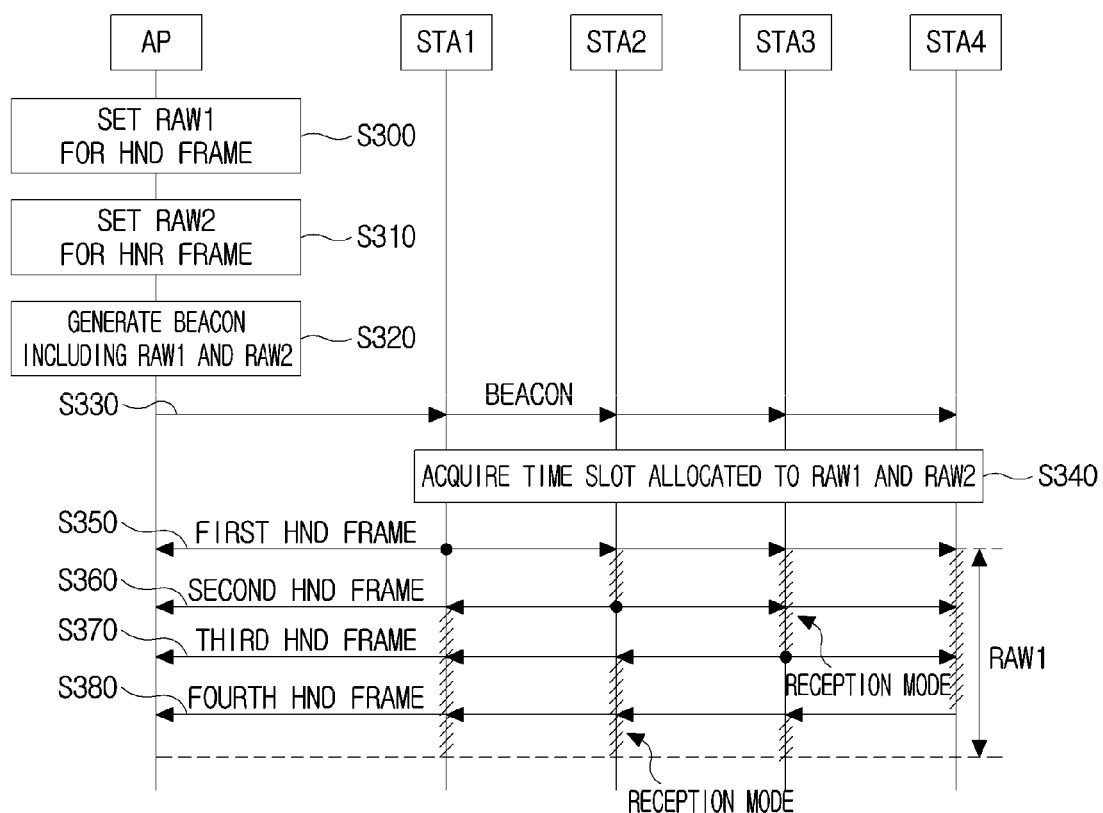
FIG. 14 is a first flowchart showing a hidden node detection method according to an embodiment of the present invention.
Figure 15:
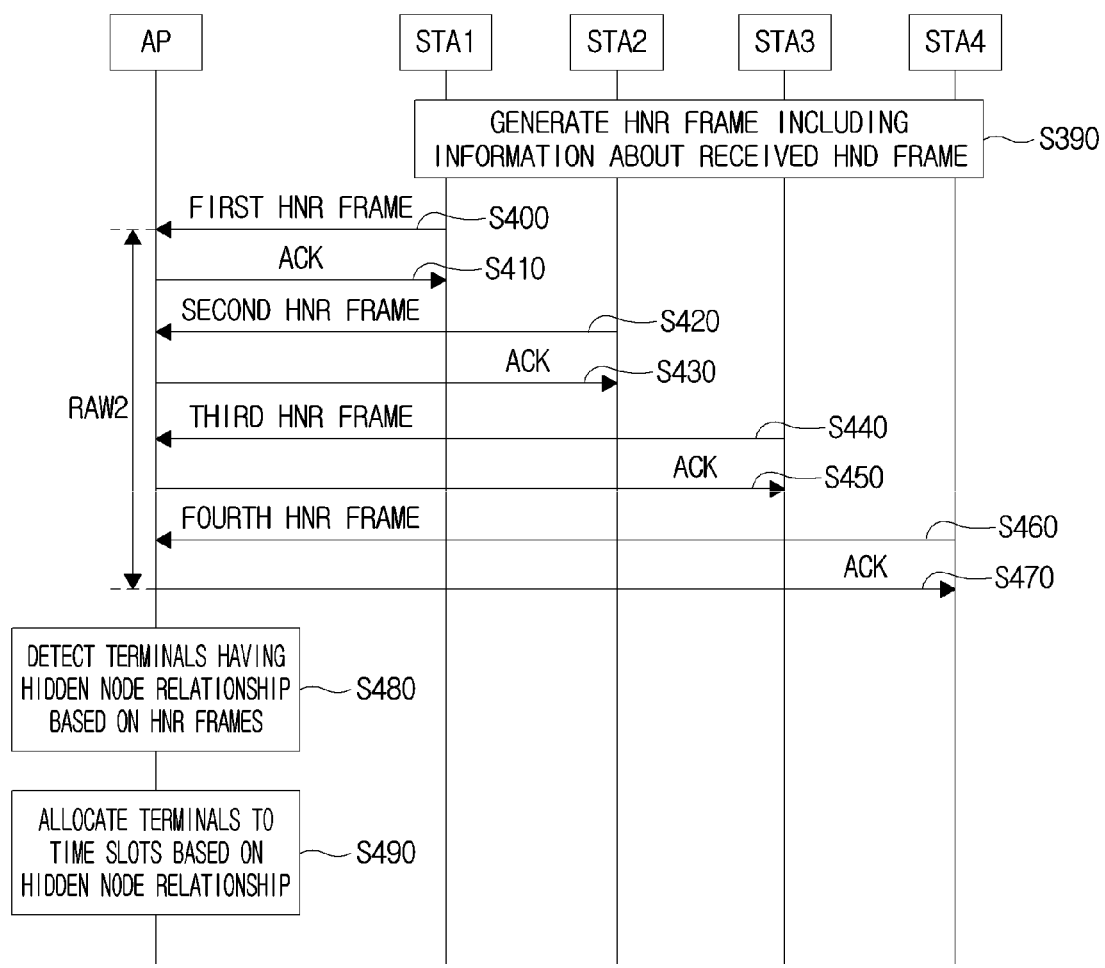
FIG. 15 is a second flowchart showing a hidden node detecting method according to an embodiment of the present invention.
Figure 16:
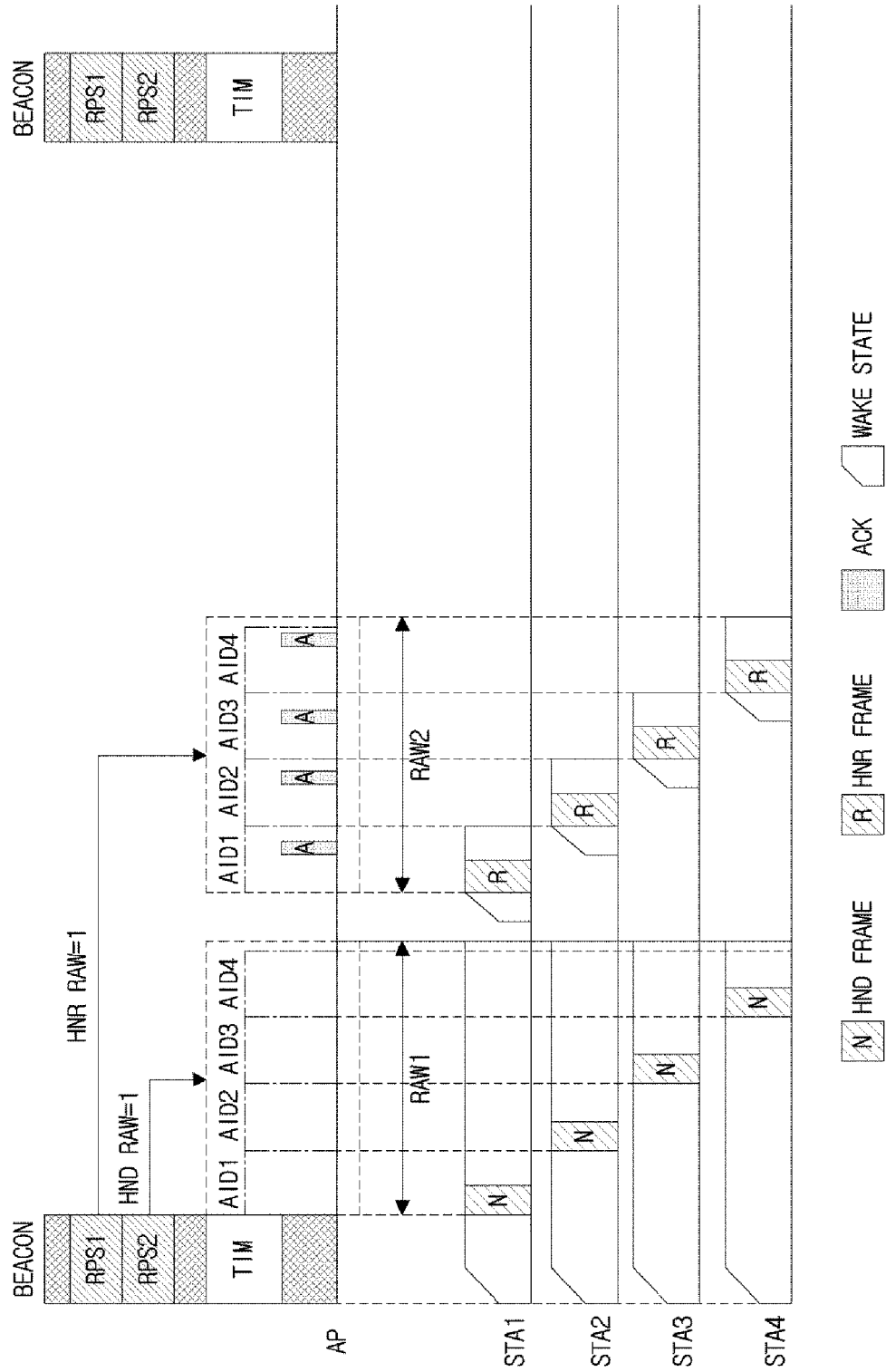
FIG. 16 is a conceptual diagram showing a hidden node detecting method according to an embodiment of the present invention.

FIG. 14 is a first flowchart showing a hidden node detecting method according to an embodiment of the present invention, FIG. 15 is a second flowchart showing a hidden node detecting method according to an embodiment of the present invention, and FIG. 16 is a conceptual diagram showing a hidden node detecting method according to an embodiment of the present invention.

Referring to FIGS. 14 to 16, the AP may set a first RAW (RAW 1) that is used for multiple terminals STA 1, STA 2, STA 3, and STA 4, each transmitting a hidden node detecting (HND) frame (S300).

The HND frame is a frame transmitted from each of the terminals STA 1, STA 2, STA 3, and STA 4 to detect a hidden node, and may be a null data packet (NDP) frame. The first RAW (RAW 1) may include multiple time slots, and a single terminal may be allocated to a single time slot. For example, the AP may allocate a first terminal STA 1 having an AID of 1 to a first time slot in the first RAW (RAW 1), allocate a second terminal STA 2 having an AID of 2 to a second time slot, allocate a third terminal STA 3 having an AID of 3 to a third time slot, and allocate a fourth terminal STA 4 having an AID of 4 to a fourth time slot.

The setting information RPS 1 of the first RAW (RAW 1) may include a same group indication field, a PRAW indication field, a page ID field, a RAW start AID field, a RAW end AID field, a RAW start time field, a RAW duration field, a field for access restricted to paged STA only, a group/resource allocation frame indication field, a sounding RAW field, an HND RAW field, a slot definition field, etc.

That is, the AP may allocate the multiple terminals STA 1, STA 2, STA 3, and STA 4 to the first RAW (RAW 1) by setting the HND RAW field.

The AP may set a second RAW (RAW 2) that is used for the multiple terminals STA 1, STA 2, STA 3, and STA 4, each transmitting a hidden node reporting (HNR) frame generated based on the HND frame (S310).

The HNR frame may include information about an HND frame received by each terminal STA 1, STA 2, STA 3, or STA 4 from another terminal. That is, the HNR frame may include at least one of the medium access control (MAC) address, AID, and basic service set ID (BSSID) of a terminal that has transmitted the HND frame. The HNR frame may further include the signal intensity of the HND frame.

The second RAW (RAW 2) may start after the first RAW (RAW 1) has ended. The second RAW (RAW 2) may include multiple time slots, and a single terminal may be allocated to a single time slot. For example, the AP may allocate the first terminal STA 1 having an AID of 1 to a first time slot in the second RAW (RAW 2), allocate the second terminal STA 2 having an AID of 2 to a second time slot, allocate the third terminal STA 3 having an AID of 3 to a third time slot, and allocate the fourth terminal STA 4 having an AID of 4 to a fourth time slot.

That is, the AP may allocate the multiple terminals STA 1, STA 2, STA 3, and STA 4 to the second RAW (RAW 2) so that the sequence of the terminals is identical to the sequence of the multiple terminals STA 1, STA 2, STA 3, and STA 4 allocated to the first RAW (RAW 1).

The setting information RPS 2 of the second RAW (RAW 2) may include a same group indication field, a PRAW indication field, a page ID field, a RAW start AID field, a RAW end AID field, a RAW start time field, a RAW duration field, a field for access restricted to paged STA only, a group/resource allocation frame indication field, a sounding RAW field, an HNR RAW field a slot definition field, etc.

That is, the AP may allocate multiple terminals STA 1, STA 2, STA 3, and STA 4 to the second RAW (RAW 2) by setting the HNR RAW field.

The AP may generate a beacon including the setting information RPS 1 of the first RAW (RAW 1) and the setting information RPS 2 of the second RAW (RAW 2) (S320). The AP may transmit the generated beacon (S330).

Each of the terminals STA 1, STA 2, STA 3, and STA 4 may receive a beacon from the AP. Each of the terminals STA 1, STA 2, STA 3, and STA 4 may acquire the time slot allocated thereto based on the setting information RPS 1 of the first RAW (RAW 1) and the setting information RPS 2 of the second RAW (RAW 2) which are included in the beacon (S340).

That is, each of the terminals STA 1, STA 2, STA 3, and STA 4 may acquire a time slot allocated thereto in the first RAW (RAW 1), based on the HND RAW field included in the setting information RPS 1 of the first RAW (RAW 1). Further, each of the terminals STA 1, STA 2, STA 3, and STA 4 may acquire a time slot allocated thereto in the second RAW (RAW 2), based on the HNR RAW field included in the setting information RPS 2 of the second RAW (RAW 2).

Each of the terminals STA 1, STA 2, STA 3, and STA 4 may transmit an HND frame in the time slot allocated thereto in the first RAW (RAW 1) and may receive HND frames transmitted from other terminals in time slots that are not allocated thereto. In this case, the respective terminals STA 1, STA 2, STA 3, and STA 4 may transmit HND frames in a broadcasting manner.

For example, when the first time slot of the first RAW (RAW 1) is allocated to the first terminal STA 1, STA 1 may transmit a first HND frame in the first time slot, and receive HND frames transmitted from other terminals in time slots other than the first time slot (S350). That is, the first terminal STA 1 may be always kept awake in the first RAW (RAW 1).

When the second time slot of the first RAW (RAW 1) is allocated to the second terminal STA 2, STA 2 may transmit a second HND frame in the second time slot, and receive HND frames transmitted from other terminals in time slots other than the second time slot (S360). That is, the second terminal STA 2 may be always kept awake in the first RAW (RAW 1).

When the third time slot of the first RAW (RAW 1) is allocated to the third terminal STA 3, STA 3 may transmit a third HND frame in the third time slot, and receive HND frames transmitted from other terminals in time slots other than the third time slot (S370). That is, the third terminal STA 3 may be always kept awake in the first RAW (RAW 1).

When the fourth time slot of the first RAW (RAW 1) is allocated to the fourth terminal STA 4, STA 4 may transmit a fourth HND frame in the fourth time slot, and receive HND frames transmitted from other terminals in time slots other than the fourth time slot (S380). That is, the fourth terminal STA 4 may be always kept awake in the first RAW (RAW 1).

Each of the terminals STA 1, STA 2, STA 3, and STA 4 may generate an HNR frame including information about the received HND frame (S390). For example, when only the second HND frame is received from the second terminal STA 2, the first terminal STA 1 may generate an HNR frame including information about the second HND frame. Alternatively, when a second HND frame is received from the second terminal STA 2 and a third HND frame is received from the third terminal STA 3, the first terminal STA 1 may generate an HNR frame including information about the second HND frame and information about the third HND frame.

Meanwhile, each of the terminals STA 1, STA 2, STA 3, and STA 4 may generate an HNR frame including information about an HND frame, received from a terminal belonging to the same BSS as the corresponding terminal, among received HND frames. For example, when the first terminal STA 1 receives a second HND frame from the second terminal STA 2 belonging to the same BSS as STA 1 itself, and receives a third HND frame from the third terminal STA 3 which belongs to a BSS different than STA 1 itself, the first terminal STA 1 may generate an HNR frame including only information about the second HND frame.

Each of the terminals STA 1, STA 2, STA 3, and STA 4 may transmit an HNR frame in a time slot allocated thereto in the second RAW (RAW 2).

For example, the first terminal STA 1 is configured to, when the first time slot of the second RAW (RAW 2) is allocated thereto, transmit a first HNR frame to the AP in the first time slot (S400), and receive an ACK that is a response to the first HNR frame from the AP (S410). Here, the first terminal STA 1 may operate in a power save mode in time slots other than the first time slot of the second RAW (RAW 2).

The second terminal STA 2 is configured to, when the second time slot of the second RAW (RAW 2) is allocated thereto, transmit a second HNR frame to the AP in the second time slot (S420), and receive an ACK that is a response to the second HNR frame from the AP (S430). Here, the second terminal STA 2 may operate in a power save mode in time slots other than the second time slot of the second RAW (RAW 2).

The third terminal STA 3 is configured to, when the third time slot of the second RAW (RAW 2) is allocated thereto, transmit a third HNR frame to the AP in the third time slot (S440), and receive an ACK that is a response to the third HNR frame from the AP (S450). Here, the third terminal STA 3 may operate in a power save mode in time slots other than the third time slot of the second RAW (RAW 2).

The fourth terminal STA 4 is configured to, when the fourth time slot of the second RAW (RAW 2) is allocated thereto, transmit a fourth HNR frame to the AP in the fourth time slot (S460), and receive an ACK that is a response to the fourth HNR frame from the AP (S470). Here, the fourth terminal STA 4 may operate in a power save mode in time slots other than the fourth time slot of the second RAW (RAW 2).

The AP may detect terminals having a hidden node relationship among the multiple terminals STA 1, STA 2, STA 3, and STA 4, based on the HNR frames received from the multiple terminals STA 1, STA 2, STA 3, and STA 4 (S480).

For example, the AP is configured to, when the first HNR frame received from the first terminal STA 1 includes information about only a second HND frame (i.e. a frame transmitted from the second terminal STA 2), determine that the third terminal STA 3 and the fourth terminal STA 4 are terminals having a hidden node relationship with the first terminal STA 1.

Alternatively, the AP is configured to, when the first HNR frame received from the first terminal STA 1 includes information about a second HND frame and a third HND frame (i.e. a frame transmitted from the third terminal STA 3), determine that the fourth terminal STA 4 is a terminal having a hidden node relationship with the first terminal STA 1.

Alternatively, the AP is configured to, when the first HNR frame received from the first terminal STA 1 includes information about a second HND frame, a third HND frame, and a fourth HND frame (i.e. a frame transmitted from the fourth terminal STA 4), determine that there is no terminal having a hidden node relationship with the first terminal STA 1.

The AP may allocate the terminals STA 1, STA 2, STA 3, and STA 4 to the time slots based on the detected hidden node relationship (S490). That is, the AP may allocate the respective terminals to the time slots so that terminals having a hidden node relationship are not allocated to the same time slot.

Although the present invention has been described with reference to the embodiments, those skilled in the art will appreciate that the present invention can be modified and changed in various forms, without departing from the spirit and scope of the invention as disclosed in the accompanying claims.

The invention claimed is:

1. A method for supporting channel access by an access point, the method comprising:
 setting a first time window including at least one time slot for allowing each of a first group of stations to access channel in a time slot of the at least one time slot within the first time window;
 setting a second time window including at least one time slot for allowing each of a second group of stations to access channel in a time slot of the at least one time slot within the second time window; and
 transmitting a beacon frame including setting information of the first time window and the second time window,
 wherein at least a portion of the first time window overlaps with at least a portion of the second time window.

2. The method of claim 1,
 wherein a start time of the second time window corresponds to a start time of the first time window plus a predetermined time.

3. The method of claim 2,
wherein the predetermined time is greater than a distributed interframe space (DIFS) and less than a length of a time slot.

4. The method of claim 1,
wherein at least a portion of a first time slot of the first time window overlaps with at least a portion of a first time slot of the second time window.

5. The method of claim 1,
wherein the first group of station has higher priority than the second group of stations.

6. A method for channel access by a station, the method comprising:
receiving, from an access point, a beacon frame including setting information of a first time window and a second time window; and
performing channel access based on the setting information,
wherein a first time window includes at least one time slot for allowing each of a first group of stations to access channel in a time slot of the at least one time slot within the first time window,
wherein the second time window includes at least one time slot for allowing each of a second group of stations to access channel in a time slot of the at least one time slot within the second time window, and
wherein at least a portion of the first time window overlaps with at least a portion of the second time window.

7. An access point for supporting channel access, the access point comprising:
a transceiver; and
a processor,
wherein the processor is configured to:
set a first time window including at least one time slot for allowing each of a first group of stations to access channel in a time slot of the at least one time slot within the first time window;
set a second time window including at least one time slot for allowing each of a second group of stations to access channel in a time slot of the at least one time slot within the second time window; and
cause the transceiver to transmit a beacon frame including setting information of the first time window and the second time window,
wherein at least a portion of the first time window overlaps with at least a portion of the second time window.

8. A station for performing channel access, the station comprising:
a transceiver; and
a processor,
wherein the processor is configured to:
cause the transceiver to receive, from an access point, a beacon frame including setting information of a first time window and a second time window; and
cause the transceiver to perform channel access based on the setting information,
wherein a first time window includes at least one time slot for allowing each of a first group of stations to access channel in a time slot of the at least one time slot within the first time window,
wherein the second time window includes at least one time slot for allowing each of a second group of stations to access channel in a time slot of the at least one time slot within the second time window, and
wherein at least a portion of the first time window overlaps with at least a portion of the second time window.

* * * * *